(12) United States Patent
Laskaris (10) Patent No.: US 6,617,714 B2
(45) Date of Patent: Sep. 9, 2003

(54) HIGH TEMPERATURE SUPER-CONDUCTING COILS SUPPORTED BY AN IRON CORE ROTOR

(75) Inventor: Evangelos Trifon Laskaris, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/854,939

(22) Filed: May 15, 2001

(65) Prior Publication Data

US 2002/0171321 A1 Nov. 21, 2002

(51) Int. Cl.[7] .................................................. H02K 9/00
(52) U.S. Cl. ........................ 310/54; 310/261; 310/179; 310/58
(58) Field of Search .............................. 310/54, 52, 58, 310/61, 60 A, 261, 269, 271, 262, 179

(56) References Cited

U.S. PATENT DOCUMENTS

| 3,991,333 A | * 11/1976 | Laskaris ...................... 310/10 |
| 4,176,291 A | * 11/1979 | Rabinowitz ................... 310/52 |
| 5,532,663 A | 7/1996 | Herd et al. |
| 5,548,168 A | 8/1996 | Laskaris et al. |
| 5,672,921 A | 9/1997 | Herd et al. |
| 5,774,032 A | 6/1998 | Herd et al. |
| 5,777,420 A | 7/1998 | Gamble et al. |
| 5,798,678 A | 8/1998 | Manlief et al. |
| 5,953,224 A | 9/1999 | Gold et al. |
| 6,066,906 A | 5/2000 | Kalsi |
| 6,140,719 A | 10/2000 | Kalsi |
| 6,169,353 B1 | 1/2001 | Driscoll et al. |
| 6,173,577 B1 | 1/2001 | Gold |
| 2002/0125787 A1 | * 9/2002 | Howard et al. |
| 2003/0011253 A1 | * 1/2003 | Kalsi et al. |
| 2003/0011273 A1 | * 1/2003 | Kalsi et al. |
| 2003/0011452 A1 | * 1/2003 | Snitchler et al. |

OTHER PUBLICATIONS

Fast, Reactive Power Support, *HTS Generators*, American Superconductor™ (Feb. 27, 2001) pp. 1–4.

* cited by examiner

*Primary Examiner*—Thanh Lam
(74) *Attorney, Agent, or Firm*—Nixon & Vanderhye P.C.

(57) ABSTRACT

A rotor for a synchronous machine is disclosed comprising: a cylindrical magnetic solid rotor core; a race-track superconducting coil winding extending around the rotor core; a coil support extending through the core and attaching to opposite long sides of the coil winding, and a pair of end shafts extending axially from said core and attached to the core.

21 Claims, 4 Drawing Sheets

HIGH TEMPERATURE SUPER-CONDUCTING COILS SUPPORTED BY AN IRON CORE ROTOR

RELATED APPLICATIONS

This application is related to the following commonly-owned and commonly-filed applications (the specifications and drawings of each are incorporated herein):

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conductive coil in a synchronous rotating machine. More particularly, the present invention relates to a rotor having a super-conductive core, coil support structures and an electromagnetic shell.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature, as a result no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal forces that stress and strain the coil windings. Normal operation of electrical machines involves thousands of start up and shut down cycles over the course of several years that result in low cycle fatigue loading of the rotor. Furthermore, the HTS rotor winding should be capable of withstanding 25% over-speed operation during rotor balancing procedures at ambient temperature and notwithstanding occasional over-speed conditions at cryogenic temperatures during power generation operation. These over-speed conditions substantially increase the centrifugal force loading on the windings over normal operating conditions.

High strains can damage HTS super-conductor wire. To withstand high strains, HTS wire have in the past been protected by massive and complex coil winding and coil support structures. However, massive, complex super-conducting windings and supports are costly, especially in state-of-the-art air core electrical machines. Moreover, these massive windings have to be cooled to cryogenic temperatures, and thus require large refrigeration systems.

The coil windings also are isolated from the hot coil supports and rotor. To isolate the coil windings, large thermal insulators have been used to separate the coils from their support systems. Because the insulators are between the coils and their support systems, prior thermal insulators are large structures that can support the high centrifugal loading of coils. Because these large thermal insulators are in contact with the cold coils, the insulators are a large heat source to the coils. While the isolators are designed to minimize heat conduction to the coils, the insulators result in large cryogenic heat loads and expensive cryorefrigerators.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy to fabricate components.

BRIEF SUMMARY OF THE INVENTION

A high temperature super-conducting (HTS) rotor has been developed having a two-pole core body formed of a solid magnetic material, such as iron. The rotor core body is generally cylindrical and has flat surfaces machined longitudinally along its length. The HTS coil is assembled around these flat surfaces and the coil has a race-track shape that extends around the core. The race-track coil is supported by tension coil support members that extend through the iron core rotor body. Drive and collector shafts are mechanically fastened to the rotor core. A cylindrical shell electromagnetic shield surrounds the HTS coil and iron core rotor body.

The iron core rotor significantly reduces the field winding ampere-turns, super-conductor utilization and cost with respect to air-cooled rotors. The single race-track shaped HTS coil replaces typical complex saddle-shaped coil windings. The tension coil support provides direct support to the HTS coil so as to reduce the strains on the coil during cool-down and centrifugal loading. Moreover, the coil support system is at cryogenic temperatures with the coil.

The HTS rotor may be implemented in a machine originally designed to include a SC coil(s). Alternatively, the HTS rotor may be implemented to replace a conventional rotor field winding of a two-pole synchronous machine with a single race-track shaped high temperature super-conducting (HTS) coil. The rotor and its SC coil are described in the context of a generator, but the HTS coil rotor and coil support disclosed here are also suitable for use in other synchronous machines.

In a first embodiment the invention is a rotor for a synchronous machine comprising: a cylindrical magnetic solid rotor core; a race-track super-conducting coil winding extending around the rotor core; a coil support extending through the core and attaching to opposite long sides of the coil winding, and a pair of end shafts extending axially from said core and attached to the core.

In a second embodiment of the invention is a method for assembling a high temperature super-conducting rotor having a coil winding on a solid iron rotor core of a synchronous machine comprising the steps of: extending a tension bar through a conduit in said rotor core, wherein said conduit extends between opposite planer sections on long sides of the core; inserting a housing over a portion of the coil; attaching an end of the tension bar to the housing, and attaching rotor end shafts to opposite ends of the rotor core.

In a further embodiment the invention is a rotor in a synchronous machine comprising: a cylindrical rotor core having a pair of planer sections on opposite sides of the core and extending longitudinally along the core; a super-conducting coil winding extending around at least a portion of the rotor core, the coil winding having a pair of side sections adjacent the planer sections of the core; a first end shaft extending axially from a first end of the rotor core, and a second end shaft extending axially from a second end of the rotor core.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
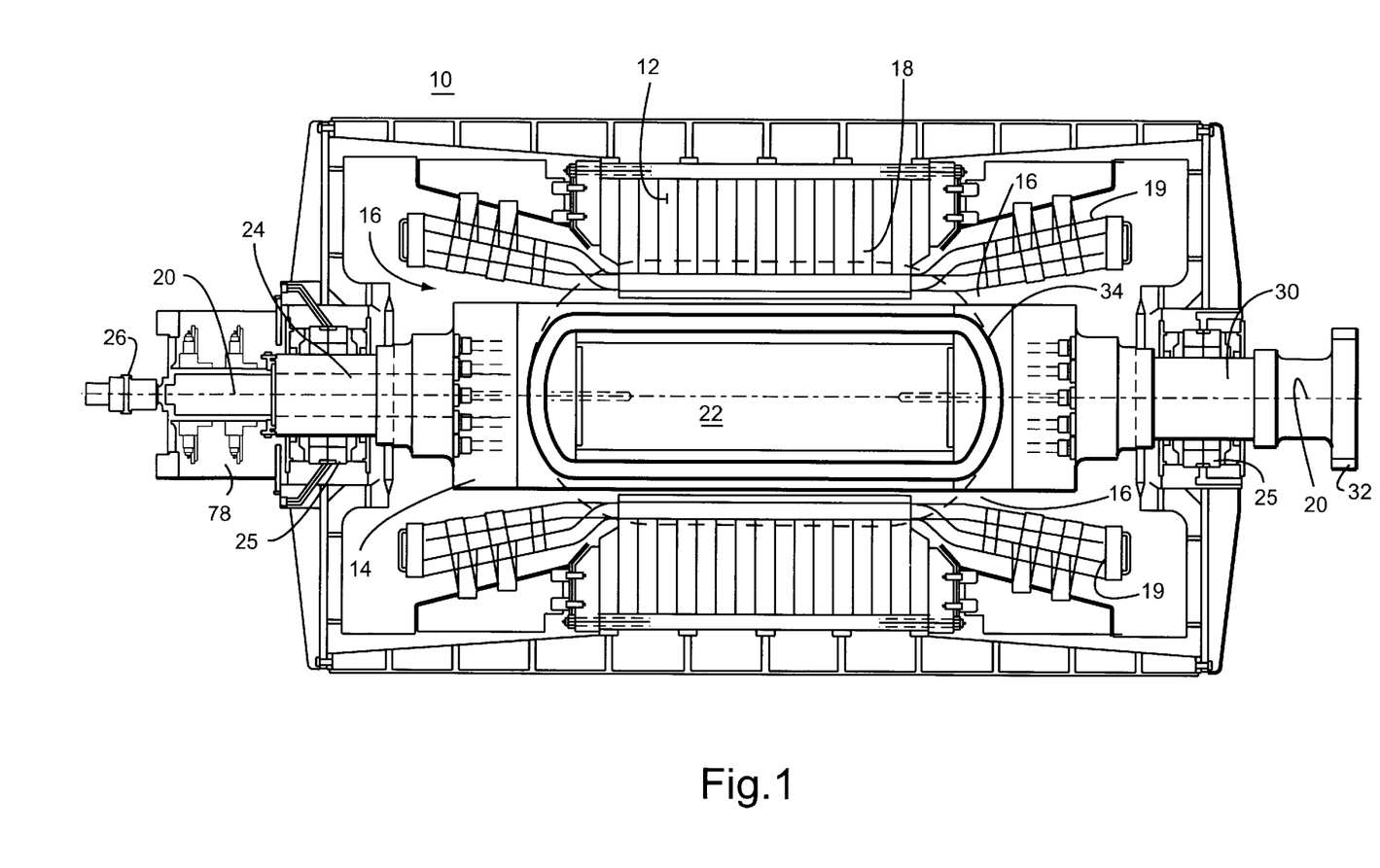
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF), and, thus, minimize the amount of super-conducting (SC) coil wire needed for the coil winding. For example, the solid iron-rotor core may be magnetically saturated at an air-gap magnetic field strength of about 2 Tesla.

Figure 2:
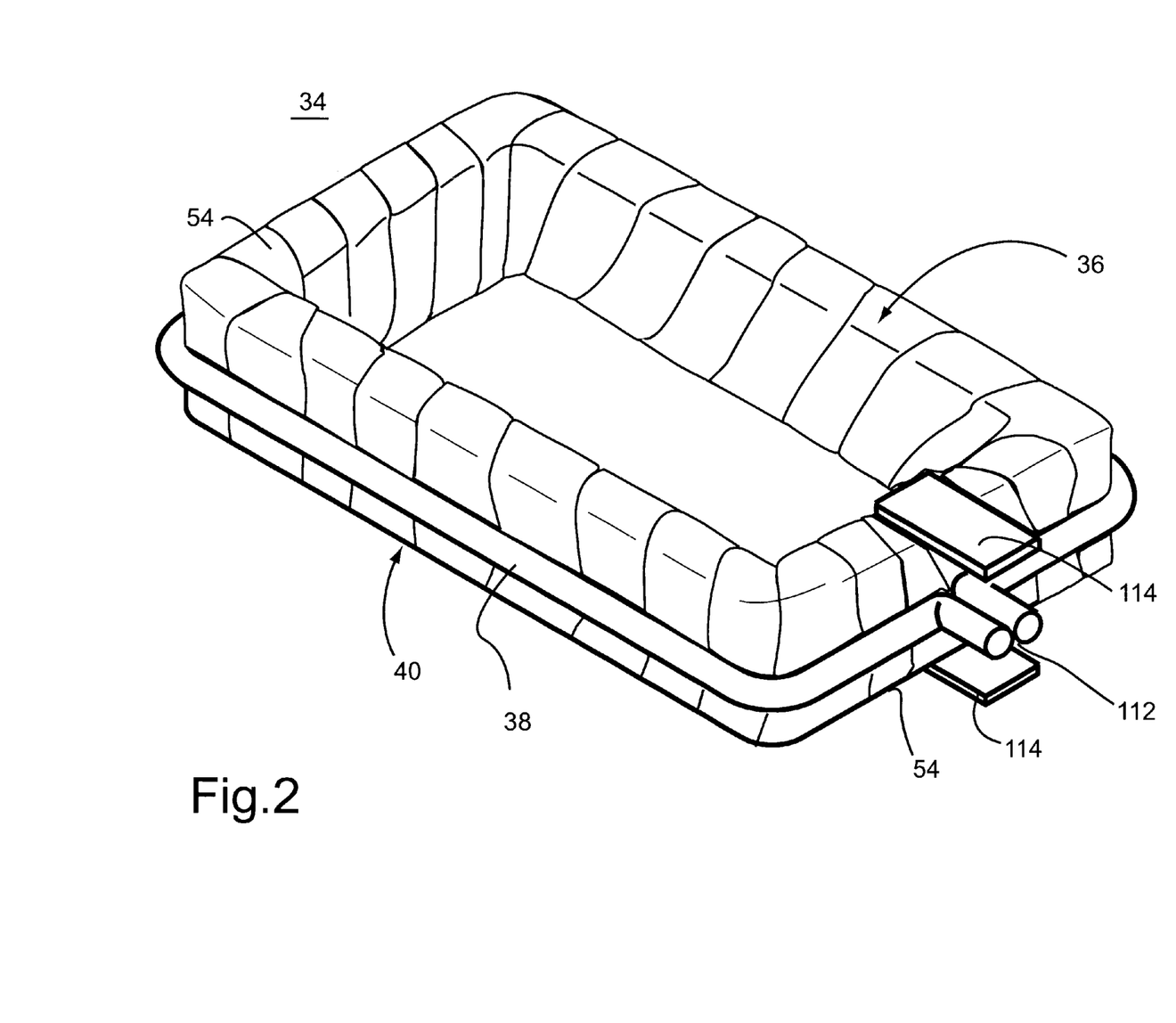
FIG. 2 is a perspective view of an exemplary race-track super-conducting coil winding.

The rotor 14 supports at least one longitudinally-extending, race-track shaped, high-temperature super-conducting (HTS) coil winding 34 (See FIG. 2). A coil support system is disclosed here for a single race-track SC coil winding. The coil support system may be adapted for coil configurations other than a single race-track coil mounted on a solid rotor core, such as a multiple race-track coil configuration.

The rotor core is supported by end shafts attached to the core. The rotor includes a collector end shaft 24 and a drive end shaft 30 that are supported by bearings 25. The end shafts may be coupled to external devices. The collector end shaft 24 includes collector rings 78 that provide an external electrical connection to the SC coil. The collector end shaft also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 of the rotor may be driven by a power turbine via power coupling 32.

FIG. 2 shows an exemplary HTS race-track field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the race-track SC coil 36.

The dimensions of the race-track coil are dependent on the dimensions of the rotor core. Generally, each race-track SC coil encircles the magnetic poles at opposite ends of the rotor core, and is parallel to the rotor axis. The coil windings are continuous around the race-track. The SC coils form a resistance free electrical current path around the rotor core and between the magnetic poles of the core. The coil has electrical contacts 114 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K, in the SC coil winding needed to promote super-conducting conditions, including the absence of electrical resistance in the coil. The cooling passages have an input and output fluid ports 112 at one end of the rotor core. These fluid (gas) ports 112 connect the cooling passages 38 on the SC coil to the cryogen transfer coupling 26.

Each HTS race-track coil winding 34 has a pair of generally straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
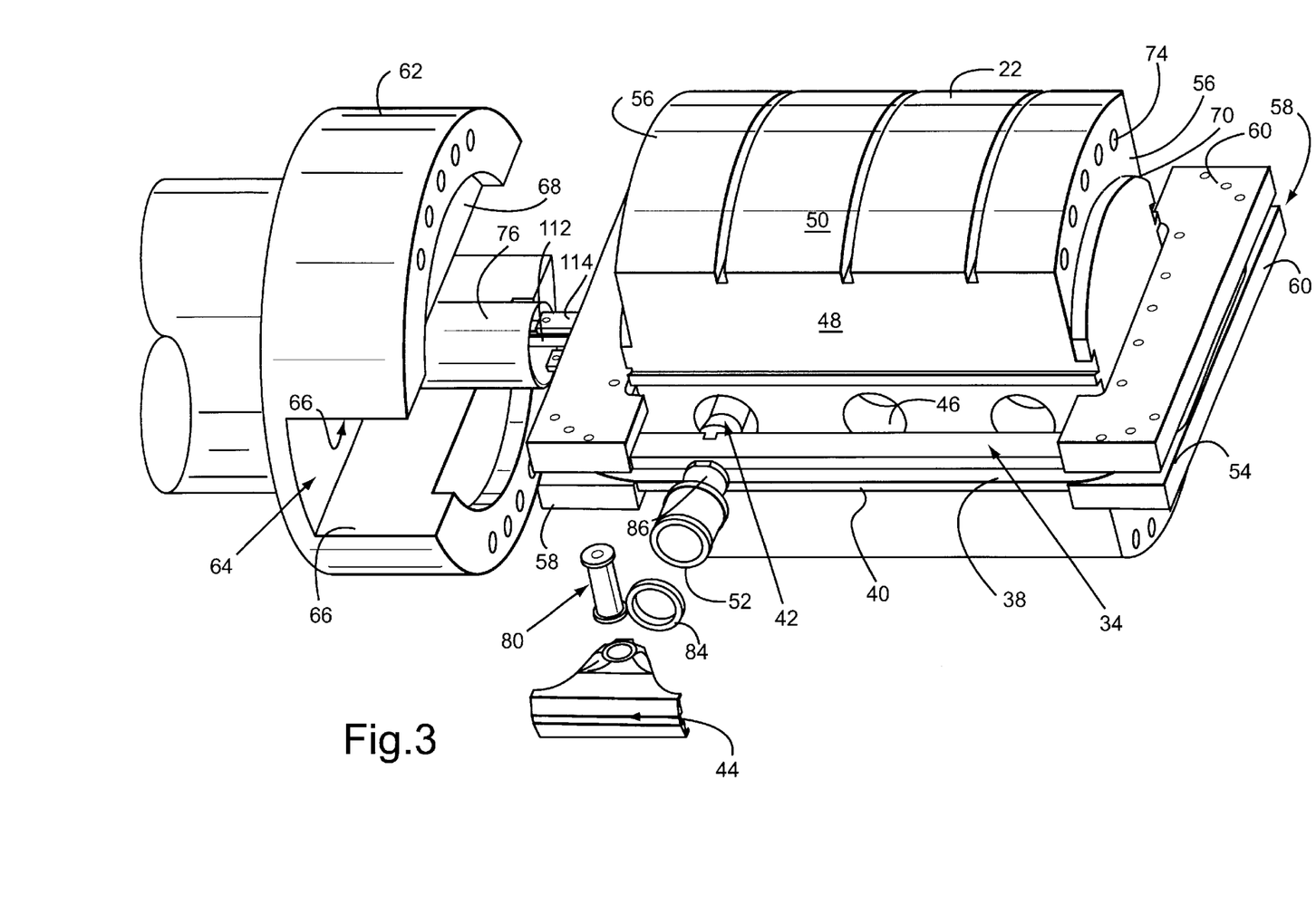
FIG. 3 is an exploded view of the components of a high temperature super-conducting (HTS) rotor.
Figure 4:
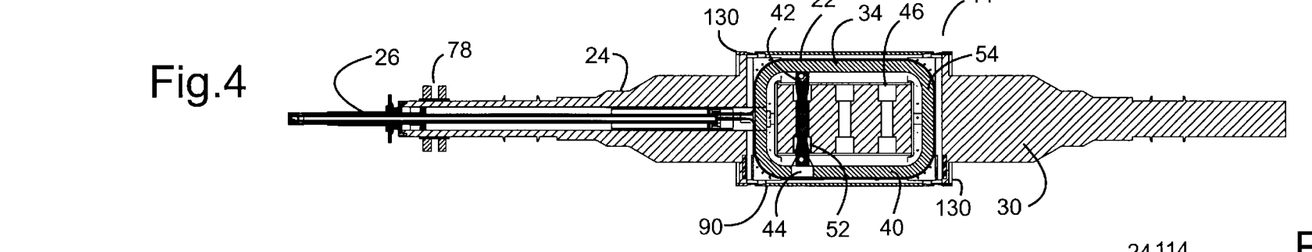
FIGS. 4 to 8 are schematic cross-sectional views of the HTS rotor shown in FIG. 3.

FIG. 3 shows an exploded view of a rotor core 22 and coil support system for a high temperature super-conducting coil. The support system includes tension rods 42 connected to U-shaped coil housings at opposite ends of each rod. The coil housings hold and support the side portions 40 of the coil winding 38 in the rotor. While one tension rod and coil housing is shown in FIG. 3, the coil support system will generally include a series of tension rods with housings at the ends of each rod. FIG. 3 shows for illustrative purposes only an end 86 of the tension rod extending beyond the side 40 of the coil, but in practice the end 86 would abut an inside surface of the coil. The tension rods and coil housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of the coil, the tension rods 42 span between the sections of the coil and attach to the coil housings 44 that grasp opposite side sections of the coil. The tension rods extend through conduits 46, e.g., apertures, in the rotor core so that the rods may span between side sections of the same coil or between adjacent coils.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate a non-conducting cylindrical insulator tube 52 that provides a slidable bearing surface and thermal isolation between the rotor core and the tension rod.

The axes of the conduits 46 are generally in a plane defined by the race-track coil. In addition, the axes of the conduits are perpendicular to the side sections of the coil to which are connected the tension rods that extends through the conduits. Moreover, the conduits are orthogonal to and intersect the rotor axis, in the embodiment shown here. The number of conduits and the location of the conduits will depend on the location of the HTS coils and the number of coil housings needed to support the side sections of the coils.

The tension rods support the coil especially well with respect to centrifugal forces as the rods extend substantially radially between the sides of the coil winding. Each tension rod is a shaft with continuity along the longitudinal direction of the rod and in the plane of the race-track coil. The longitudinal continuity of the tension rods provides lateral stiffness to the coils which provides rotor dynamics benefits. Moreover, the lateral stiffness permits integrating the coil support with the coils so that the coil can be assembled with the coil support prior to final rotor assembly. Pre-assembly of the coil and coil support reduces production cycle, improves coil support quality, and reduces coil assembly variations. The race-track coil is supported by an array of tension members that span the long sides of the coil. The tension rod coil support members are pre-assembled to coil.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for super-conducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor.

An individual support member consists of a tension rod 42 (which may be a bar and a pair of bolts at either end of the bar), a pair of coil housings 44, and a dowel pin 80 that connects each housing to an end of the tension rod. Each coil housing 44 is a U-shaped bracket having legs that connect to a tension rod and a channel to receive the coil winding 34. The U-shaped housing allows for the precise and convenient assembly of the support system for the coil. A series of coil housings may be positioned end-to-end along the side of the coil winding. The coil housings collectively distribute the forces that act on the coil, e.g., centrifugal forces, over substantially the entire side sections 40 of each coil.

The coil housings 44 prevent the side sections 40 of the coils from excessive flexing and bending due to centrifugal forces. The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The U-shaped housings are formed of a light, high strength material that is ductile at cryogenic temperatures. Typical materials for coil housings are aluminum, Inconel, or titanium alloys, which are non-magnetic. The shape of the U-shaped housing may be optimized for low weight and strength.

The dowel pin 80 extends through apertures in the coil housing and tension rod. The dowel may be hollow for low weight. Locking nuts (not shown) are threaded or attached at the ends of the dowel pin to secure the housing and prevent the sides of the housing from spreading apart under load. The dowel pin can be made of high strength Inconel or titanium alloys. The tension rods are made with larger diameter ends that are machined with two flat surfaces 86 at their ends.

The width of these flat surfaces fit the U-shaped housing and coil width. The flat ends 86 of the tension rods abut an inside surface of the HTS coils 34, when the rod, coil and housing are assembled together. This assembly reduces the stress concentration at the hole in the tension rod that receives the dowel.

The coil support system of tension rods 42 and coil housings 44 for the long sides 40 of the coil, and a pair of split-clamps 58 for the coil ends may be assembled with the HTS coil windings 34 as both are mounted on the rotor core 22. The tension rods, channel housings and clamp provide a fairly rigid structure for supporting the coil windings and holding the coil windings in place with respect to the rotor core.

Each tension rod 42 extends through the rotor core, and may extend orthogonally through the axis 20 of the rotor. Conduits 46 through the rotor core provide a passage through which extend the tension rods. The conduits 46 extend perpendicularly through the rotor axis and are symmetrically arranged along the length of the core. The number of conduits 46 and tension rods 42, and their arrangement on the rotor core and with respect to each other is a matter of design choice. The diameter of the conduits is sufficiently large to avoid having the hot rotor walls of the conduits be in contact with the cold tension rods. The avoidance of contact improves the thermal isolation between the tension rods and the rotor core.

Figures 5, 6, 7, 8:
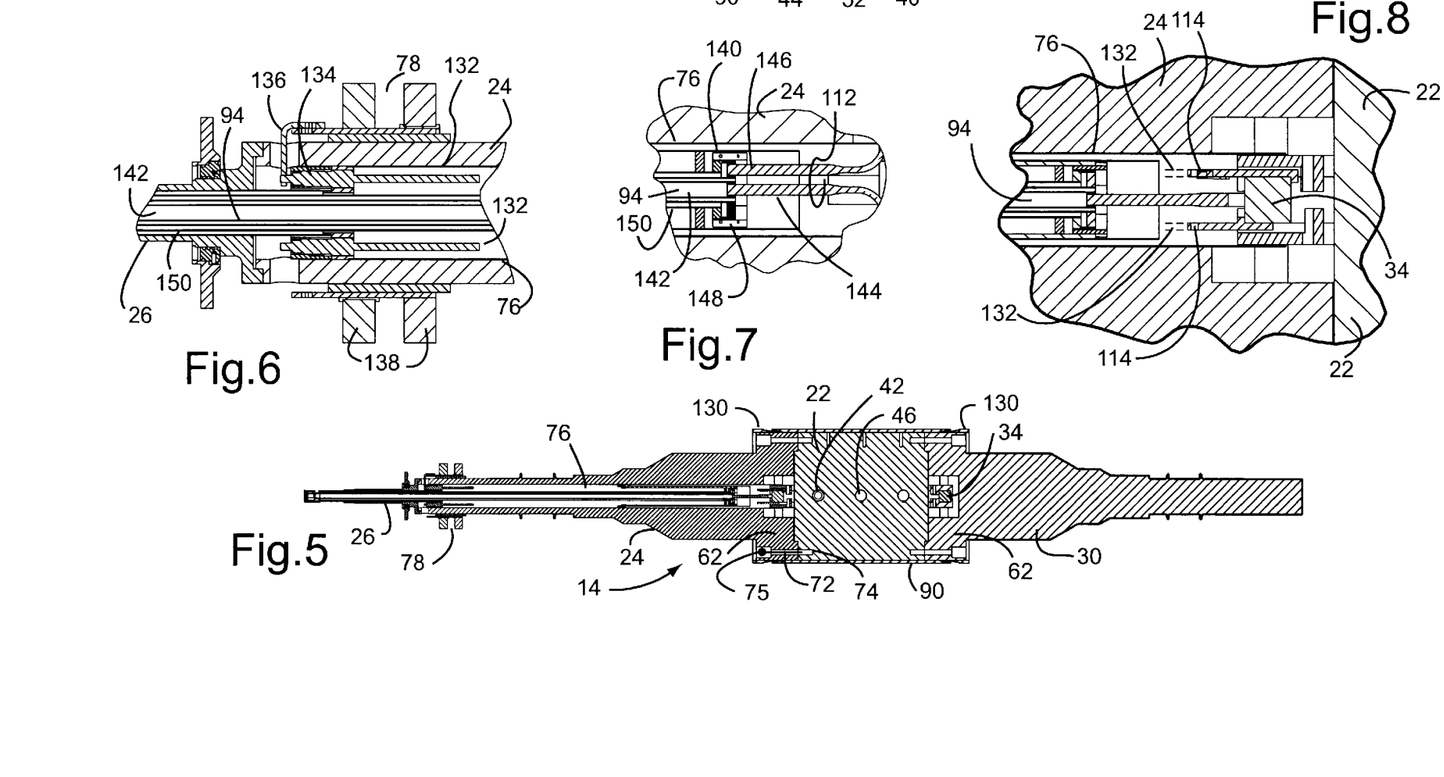

As shown in FIGS. 5 and 6, the rotor 14 comprises three main structural components, a stainless steel drive shaft 30, an iron rotor core 22, and a non-magnetic stainless steel collector shaft 24. The rotor core and end shafts are typically discrete components that are assembled and securely joined together by either bolting or welding. The drive and collector shafts are rabbeted and bolted to the iron rotor core. The iron rotor core is a cylindrical forging with flats 48 machined across the quadrature axis of the core to accept a race-track coil 34 that is wound with high temperature super-conductor tape 36.

A highly-conductive, cylindrical shell 90, made of copper or aluminum alloys fits over the rotor core. The shell 90 serves as an electromagnetic shield for the rotor winding and may form a vacuum envelope to a vacuum space that surrounds the low temperature rotor coil winding 34. The ends of the electromagnetic shield are bonded to stainless steel transition rings 130 as part of the shield 90 fabrication. The shield subassembly is welded to the drive and collector shafts to make a vacuum tight assembly around the coil windings.

To receive the coil winding, the rotor core has recessed surfaces 48, such as flat or triangular regions or slots. These surfaces 48 are formed in the curved surface of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer surface of the coil winding extend to substantially an envelope defined by the rotation of the rotor. The outer curved surfaces 50 of the rotor core when rotated define a cylindrical envelope. This rotation envelope of the rotor has substantially the same diameter as the rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels to receive the coil winding and connections 112, 114 to the winding.

The split clamp 58 may be formed of a non-magnetic material, such as aluminum or Inconel alloys. The same or similar non-magnetic materials may be used to form the tension rods, channel housings and other portions of the coil support system. The coil support system is preferably non-magnetic so as to preserve ductility at cryogenic temperatures, since ferromagnetic materials become brittle at temperatures below the Curie transition temperature and cannot be used as load-carrying structures.

The split clamp 58 is surrounded by, but is not in contact with collar 62. The end shafts 24, 30 include a collar 62 that connects to an end of the rotor core 22. The collar is a thick disk of non-magnetic material, such as stainless steel, the same as or similar to the material that forms the rotor end shafts. The collar has a slot 64 orthogonal to the rotor axis and sufficiently wide to receive and clear the split clamp 58. The hot side-walls 66 of the slot collar are spaced apart from the cold split clamp so they do not come in contact with each other.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region on the end 56 of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts 75 (see FIG. 5) extend through these longitudinal bolt holes 72, 74 and secure the collars to the rotor core.

The rotor core may be encased in a metallic cylindrical shield 90 that protects the super-conducting coil winding 34 from eddy currents and other electrical currents that surround the rotor and provides the vacuum envelope as required to maintain hard vacuum around the cryogenic components of the rotor. The cylindrical shield 90 may be formed of a highly conductive material, such as a copper alloy or aluminum. The SC coil winding 34 is maintained in a vacuum. The vacuum may be formed by the shield 90 which may include a stainless steel cylindrical layer that forms a vacuum vessel around the coil and rotor core.

FIGS. 6, 7 and 8 show cross-sectional close-up diagrams of the collector end shaft 24. In particular, these figures show a conduit tube 76 through the shaft which provides a passageway for the cooling fluid tubes and electrical lines. FIGS. 7 and 8 show the conduit 76 of the collector end shaft, and associated shaft structures near the rotor core. The cross section shown in FIG. 7 is orthogonal to the cross section shown in FIG. 8. FIG. 6 shows a cross section of the end of the collector shaft 24 near the cooling coupling 26.

The electrical connections 114 from the coil winding 34 are connected to electrical lines 132. These lines extend the length of the end shaft 24 towards the collector rings 78. The electrical lines 132 extend through the conduit 76. The cold end segments of lines 132 are supported inside the thermal standoff insulator tube 140. An electrical contact 134 connects the electrical line 132 from inside the end shaft to a lead 136 that extends outside the shaft to the collector coupling rings 138.

The cooling fluid inlet and outlet ports 112 from the coil connect to the inlet and outlet cooling tubes 94 that extend the length of the end shaft. These tubes are coaxial. The inlet tube 142 is at the center of the outlet tube 150. The inlet tube 142 extends to an inlet port 144 of the coil coupling 112 that is coaxial with the rotor axis. The cooling gas outlet port 146 of the coil coupling 112 is offset from the rotor access. The outlet port couples to a gas transfer housing 148 which directs cooling fluid from the coil to an annular outlet tube 150. The outlet tube 150 is coaxial with the inlet tube 142 and external to the inlet tube.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A rotor for a synchronous machine comprising
   a cylindrical magnetic solid rotor core having at least one conduit extending through the core and perpendicular to a core axis;
   a race-track super-conducting coil winding extending around the rotor core, wherein said coil winding is in a plane of the at least one conduit;
   a coil support extending through the at least one conduit of the core and attaching to opposite long sides of the coil winding, wherein a gap is between said coil support and said conduit such that the coil support is thermally isolated from said conduit, and
   a pair of end shafts extending axially from said core and attached to the core.

2. A rotor as in claim 1 wherein the rotor core includes a pair of flat surfaces formed on opposite long sides of the rotor core, and said long sides of the coil winding are adjacent the flat surfaces, and wherein said at least one conduit has an opening on each of said flat surfaces.

3. A rotor as in claim 1 wherein the coil support system and coil are at cryogenic temperatures, and the coil support system is thermally isolated from the rotor core.

4. A rotor as in claim 3 wherein an insulating tube inserted in the at least one conduit of the rotor core separates the coil support from the core.

5. A rotor as in claim 1 wherein the end shafts are a non-magnetic metal.

6. A rotor as in claim 5 wherein the end shafts are stainless steel.

7. A rotor as in claim 1 wherein the rotor core is a solid magnetic iron forging.

8. A rotor as in claim 1 wherein the coil has a race-track shape.

9. A rotor as in claim 1 further comprising a conductive shield around the rotor core and coil.

10. A rotor as in claim 1 wherein one of said end shafts is a collector end shaft having collector rings and a cryogenic fluid coupling.

11. In a synchronous machine, a rotor comprising:
    a cylindrical rotor core having a pair of planer sections on opposite sides of the core and extending longitudinally along the core, at least one conduit extending through said core and having openings on each of said planer sections;
    a super-conducting coil winding extending around at least a portion of the rotor core, said coil winding having a pair of side sections adjacent said planer sections of the core, and said side sections aligned with the openings of the at least one conduit;
    a coil support extending through the at least one conduit and attached to the side sections of the coil winding wherein said coil support is thermally isolated from the rotor core;
    a first end shaft extending axially from a first end of the rotor core, and a second end shaft extending axially from a second end of the rotor core.

12. In a rotor as in claim 11 wherein the first end shaft includes a cryogenic coupling for providing cooling fluid to said coil winding.

13. In a rotor as in claim 11 wherein said coil support further comprises at least one tension rod extending through the at conduit of the core and said tension rod attaches to coil housings at opposite ends of the rod, wherein each coil housing wraps around one of the side sections of the coil.

14. A rotor as in claim 13 wherein the coil support and coil are at cryogenic temperatures, and the coil support is thermally isolated from the rotor core.

15. A rotor as in claim 14 wherein an insulating tube inserted in the conduit of the rotor core separates the tension rod from the core.

16. A rotor as in claim 11 wherein the end shafts are a non-magnetic metal.

17. A rotor as in claim 16 wherein the end shafts are stainless steel.

18. A rotor as in claim 11 wherein the rotor core is a solid magnetic iron forging.

19. A rotor as in claim 11 wherein the coil has a race-track shape.

20. A rotor as in claim 11 further comprising a conductive shield around the rotor core and coil.

21. A rotor as in claim 11 wherein one of said end shafts is a collector end shaft having collector rings and a cryogenic fluid coupling.

* * * * *